US012639613B2

(12) United States Patent
Debnath et al.

(10) Patent No.: US 12,639,613 B2
(45) Date of Patent: May 26, 2026

(54) AUTOMATION DESIGN FOR ACHIEVING LONG TERM STABLE OPERATION OF QUANTUM COMPUTERS

(71) Applicant: IonQ, Inc., College Park, MD (US)

(72) Inventors: Shantanu Debnath, Landham, MD (US); Aleksey Blinov, Evanston, IL (US); Coleman Collins, Chicago, IL (US); Kevin Antony Landsman, Rockville, MD (US); Jason Hieu Van Nguyen, Hyattsville, MD (US); Hermann Uys, Annapolis, MD (US); Kristin M. Beck, Livermore, CA (US); Peter Lukas Wilhelm Maunz, Albuquerque, NM (US); Matthew Keesan, Keuka Park, NY (US)

(73) Assignee: IonQ, Inc., College Park, MD (US)

( * ) Notice: Subject to any disclaimer, the term of this patent is extended or adjusted under 35 U.S.C. 154(b) by 861 days.

(21) Appl. No.: 18/048,279

(22) Filed: Oct. 20, 2022

(65) Prior Publication Data

US 2024/0370759 A1 Nov. 7, 2024

Related U.S. Application Data

(60) Provisional application No. 63/257,918, filed on Oct. 20, 2021.

(51) Int. Cl.
*G06N 10/70* (2022.01)

(52) U.S. Cl.
CPC ..................................... *G06N 10/70* (2022.01)

(58) Field of Classification Search
CPC ......... G06N 10/70; G06N 10/00; G06N 10/40
See application file for complete search history.

(56) References Cited

U.S. PATENT DOCUMENTS

| | | | | |
|---|---|---|---|---|
| 11,875,222 | B1 * | 1/2024 | Reagor ................. | G06N 10/20 |
| 2022/0383171 | A1 * | 12/2022 | Griffin ................. | G06F 1/3203 |
| 2023/0020389 | A1 * | 1/2023 | Davis ................... | G06F 9/5038 |
| 2023/0034075 | A1 * | 2/2023 | Griffin ................. | G06N 10/00 |

* cited by examiner

*Primary Examiner* — Tan H Tran
(74) *Attorney, Agent, or Firm* — ARENTFOX SCHIFF LLP

(57) ABSTRACT

Aspects of the present disclosure relate generally to systems and methods for use in the implementation and/or operation of quantum information processing (QIP) systems. To optimize the performance of QIP systems or quantum computers in terms of both fidelity and algorithm uptime or throughput, described are techniques to stabilize continuous and discrete errors from drifting and/or noisy secondary observables to achieve long term stable operation.

18 Claims, 8 Drawing Sheets

*Mode J*

Mode D0

Execution Flow

600

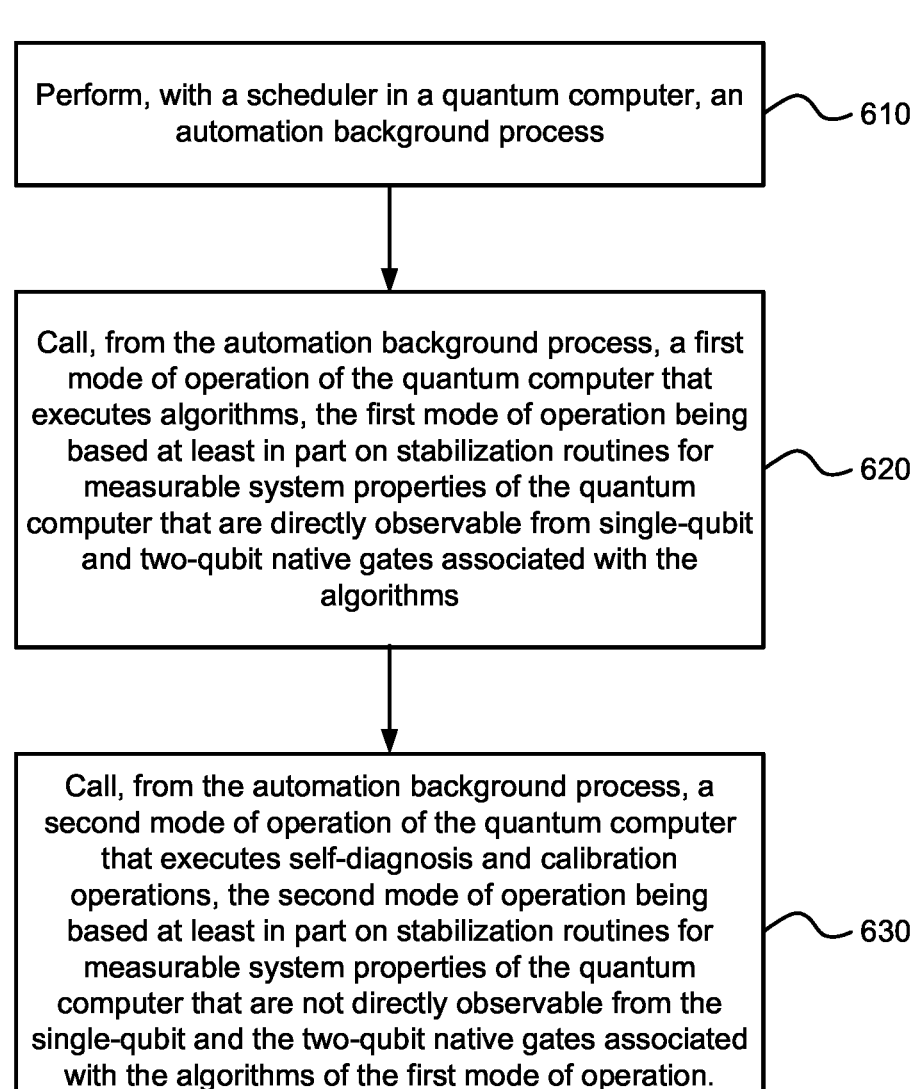

Perform, with a scheduler in a quantum computer, an automation background process ⟍ 610

Call, from the automation background process, a first mode of operation of the quantum computer that executes algorithms, the first mode of operation being based at least in part on stabilization routines for measurable system properties of the quantum computer that are directly observable from single-qubit and two-qubit native gates associated with the algorithms ⟍ 620

Call, from the automation background process, a second mode of operation of the quantum computer that executes self-diagnosis and calibration operations, the second mode of operation being based at least in part on stabilization routines for measurable system properties of the quantum computer that are not directly observable from the single-qubit and the two-qubit native gates associated with the algorithms of the first mode of operation. ⟍ 630

FIG. 6

AUTOMATION DESIGN FOR ACHIEVING LONG TERM STABLE OPERATION OF QUANTUM COMPUTERS

PRIORITY

This application claims priority to and the benefit from U.S. Provisional Application No. 63/257,918, filed on Oct. 20, 2021, and titled "Automation Design for Achieving Long Term Stable Operation of Quantum Computers," the contents of which are incorporated herein by reference in their entirety.

BACKGROUND

Aspects of the present disclosure relate generally to systems and methods for use in the implementation, operation, and/or use of quantum information processing (QIP) systems.

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, and/or functionality of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of techniques used in automation design for achieving long term stable operation of quantum computers. For example, a method for stable operation of a quantum computer is described that includes performing, with a scheduler in the quantum computer, an automation background process. The method further includes calling, from the automation background process, a first mode of operation of the quantum computer that executes algorithms, the first mode of operation being based at least in part on stabilization routines for measurable system properties of the quantum computer that are directly observable from single-qubit and two-qubit native gates associated with the algorithms. The method further includes calling, from the automation background process, a second mode of operation of the quantum computer that executes self-diagnosis and calibration operations, the second mode of operation being based at least in part on stabilization routines for measurable system properties of the quantum computer that are not directly observable from the single-qubit and the two-qubit native gates associated with the algorithms of the first mode of operation.

A quantum computer is also described that includes an ion trap configured to hold multiple ions for implementing single-qubit gates and multi-qubit gates, and a scheduler. The scheduler may be configured to perform an automation background process. The scheduler may be further configured to call, from the automation background process, a first mode of operation of the quantum computer that executes algorithms, the first mode of operation being based at least in part on stabilization routines for measurable system properties of the quantum computer that are directly observable from single-qubit and two-qubit native gates associated with the algorithms. The scheduler may be further configured to call, from the automation background process, a second mode of operation of the quantum computer that executes self-diagnosis and calibration operations, the second mode of operation being based at least in part on stabilization routines for measurable system properties of the quantum computer that are not directly observable from the single-qubit and the two-qubit native gates associated with the algorithms of the first mode of operation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 4 illustrates an example of benchmark measurements and calibrations that stabilize drifting system observables over long periods of time as prerequisites for running any algorithms in accordance with aspects of this disclosure.

FIG. 6 illustrates an example of a method for stabilizing drifting system observables in accordance with aspects of this disclosure.

DETAILED DESCRIPTION

Figure 1:
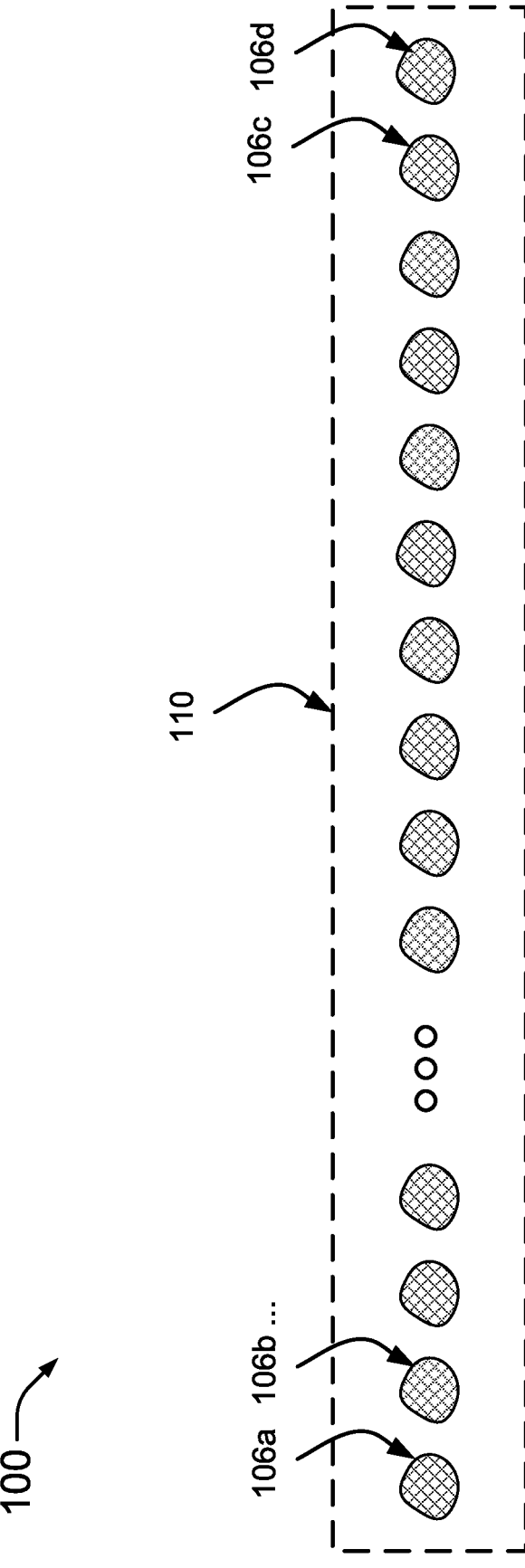
FIG. 1 illustrates a view of atomic ions a linear crystal or chain in accordance with aspects of this disclosure.

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well-known components.

The performance of any quantum computer or QIP system (see e.g., FIGS. 2 and 3 below) should be maximized over a long period of operation to ensure consistent results in the execution of algorithms or other operations. The terms quantum computers and QIP systems may be used interchangeably throughout this disclosure. Quantum computers are subject to drifts in their systematic properties due to external noise that may couple into qubit operations. While there are measurable effects of drifts that can be directly detected on the single-qubit and two-qubit native gates of a quantum processing unit or quantum processor, there are usually additional drifting observables (measurable system properties) of the system, which cannot be measured well enough during the course of a benchmark measurement on the gates themselves. This is because such secondary influencers couple weakly to gate operations causing slow drifts in them, which if allowed to accumulate over time, eventually contribute to substantial errors in the native gate operations.

These secondary observables can have continuous drifts as well as discrete failure modes of the hardware and/or software of the quantum computer. For example, in trapped atomic ions quantum processors where atomic ions are cooled and trapped using lasers (see e.g., an ion chain 110 in FIG. 1), the slow drift of the laser mode quality over time can affect the cooling efficiency of the ions, which in turn affects the temperature at which quantum gates are performed. Nominally, the gate fidelity has a weak dependence on temperature, which is why only a large drift in the laser mode quality resulting in a large variation of the temperature can show up as a noticeable degradation of gate fidelity. Therefore, this observable (i.e., drifting laser mode) cannot be efficiently measured using gates but instead requires a separate (non-gate based) method that can be used to detect it with higher sensitivity. It is worth noting that such a drift can additionally also cause discrete errors on the quantum processors too, such as reduced lifetime of trapped atoms resulting in reduced uptime of running quantum algorithms on the quantum processor. Therefore, in this case, both the continuous and discrete effects of a drifting laser mode are equally detrimental for system performance.

To optimize the performance of the quantum computer or QIP system in terms of both fidelity and algorithm uptime (or throughput), one has to stabilize both continuous and discrete errors from drifting and/or noisy secondary observables to achieve long term stable operation.

Solutions to the issues described above are explained in more detail in connection with FIGS. 1-5C, with FIGS. 1-3 providing a background of quantum computers or QIP systems, and more specifically, of atomic-based quantum computers or QIP systems.

Figure 2:
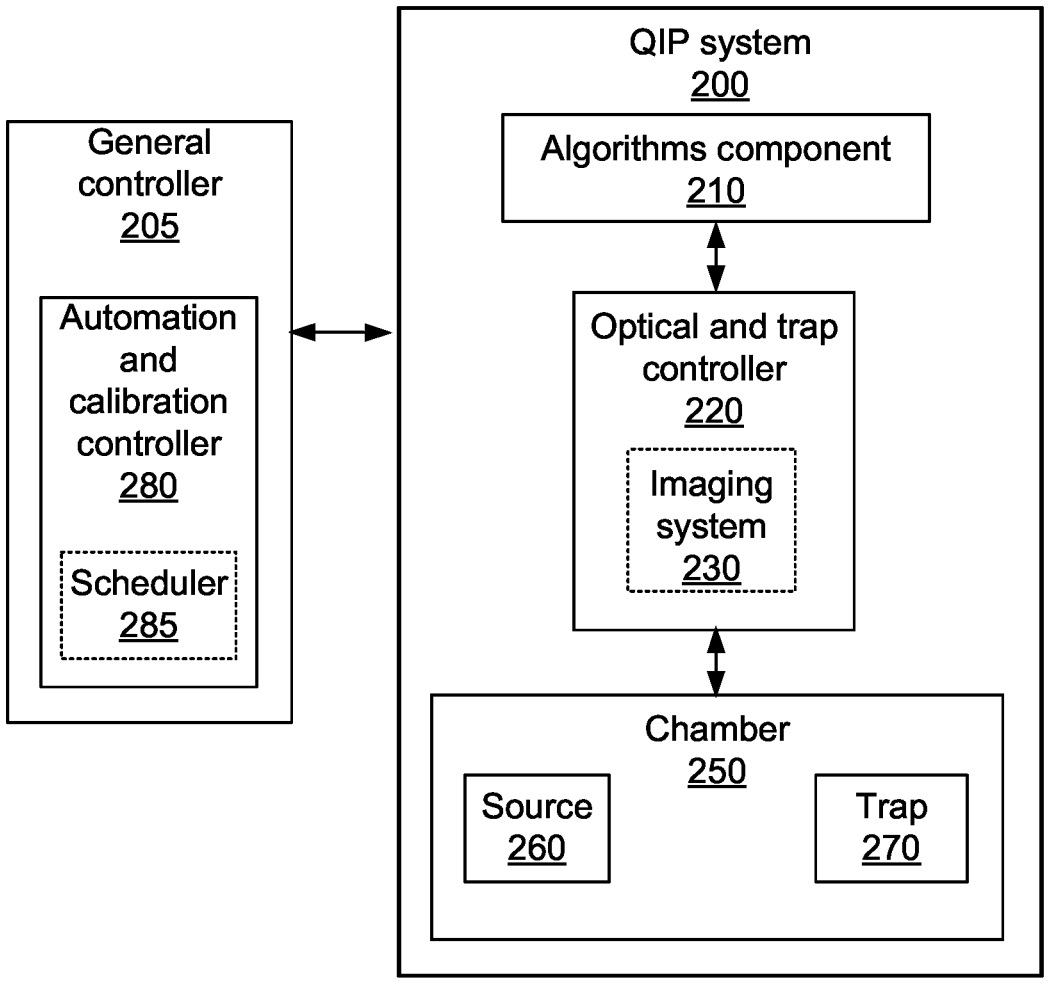
FIG. 2 illustrates an example of a QIP system in accordance with aspects of this disclosure.

FIG. 1 illustrates a diagram 100 with multiple atomic ions or ions 106 (e.g., ions 106a, 106b, . . . , 106c, and 106d) trapped in a linear crystal or chain 110 using a trap (not shown; the trap can be inside a vacuum chamber as shown in FIG. 2). The trap may be referred to as an ion trap. The ion trap shown may be built or fabricated on a semiconductor substrate, a dielectric substrate, or a glass die or wafer (also referred to as a glass substrate). The ions 106 may be provided to the trap as atomic species for ionization and confinement into the chain 110. Some or all of the ions 106 may be configured to operate as qubits in a quantum computer or QIP system. Moreover, a quantum processor, sometimes referred simply as a processor, may indicate a portion of the quantum computer or QIP system that includes the chain 110 and uses the ions 106 in the chain 110 to perform quantum operations.

In the example shown in FIG. 1, the trap includes electrodes for trapping or confining multiple ions into the chain 110 laser-cooled to be nearly at rest. The number of ions trapped can be configurable and more or fewer ions may be trapped. The ions can be ytterbium ions (e.g., $^{171}Yb^+$ ions), for example. The ions are illuminated with laser (optical) radiation tuned to a resonance in $^{171}Yb^+$ and the fluorescence of the ions is imaged onto a camera or some other type of detection device (e.g., photomultiplier tube or PMT). In this example, ions may be separated by a few microns (μm) from each other, although the separation may vary based on architectural configuration. The separation of the ions is determined by a balance between the external confinement force and Coulomb repulsion and does not need to be uniform. Moreover, in addition to ytterbium ions, barium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

The techniques described herein related to automation design for achieving long term stable operation of quantum computers or QIP systems may be used to stabilize drifts in observables that affect the implementation or operation of single-qubit and two-qubit native gates formed or implemented with the ions 106 in the chain 110.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250. A scheduler 285 for controlling, performing, implementing, and/or executing the techniques described herein for use in automation design to achieve long term stable operation of quantum computers may be part of the automation and calibration controller 280. In alternative implementations, the scheduler 285 may be part of the general controller 205 or may be part of the QIP system 200.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facility such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. The optical and trap controller 220 may also control the operation of lasers, optical systems, and optical components that are used to provide the optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using the general controller 205, the automation and calibration controller 280, and/or the scheduler 285. Other components of the QIP system 200 may be involved in the techniques described herein and their participation may be controlled by the general controller 205, the automation and calibration controller 280, and/or the scheduler 285.

Figure 3:
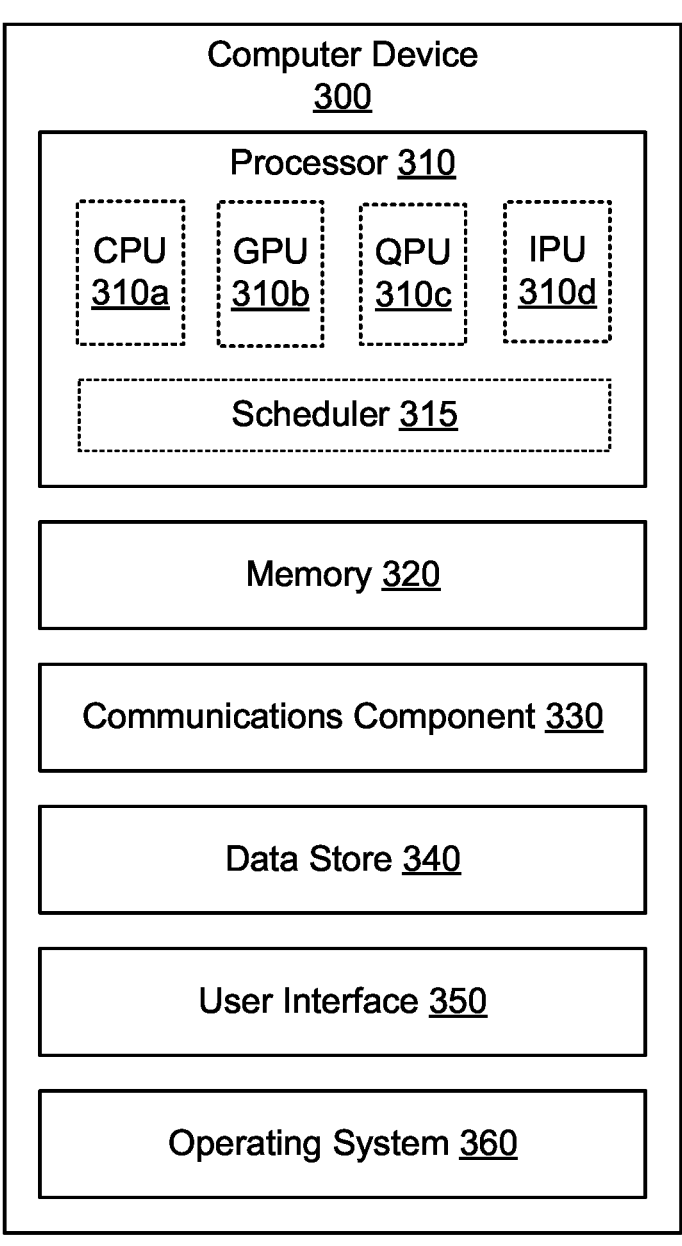
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310*a*, one or more graphics processing units (GPUs) 310*b*, one or more quantum processing units (QPUs) 310*c*, one or more intelligence processing units (IPUs) 310*d* (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310*c*. Some or all of the QPUs 310c may use atomic-based qubits, however, it is possible that different QPUs are based on different qubit technologies.

A scheduler 315 configured to control, perform, implement, and/or execute the techniques described herein for use in automation design to achieve long term stable operation of quantum computers may be implemented as part of the processor 310. Alternatively, the scheduler 315 may be part of the QPU 310c.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, the following description provides details on the techniques that enable automation design for achieving long term stable operation of quantum computers or QIP systems.

Figure 4:
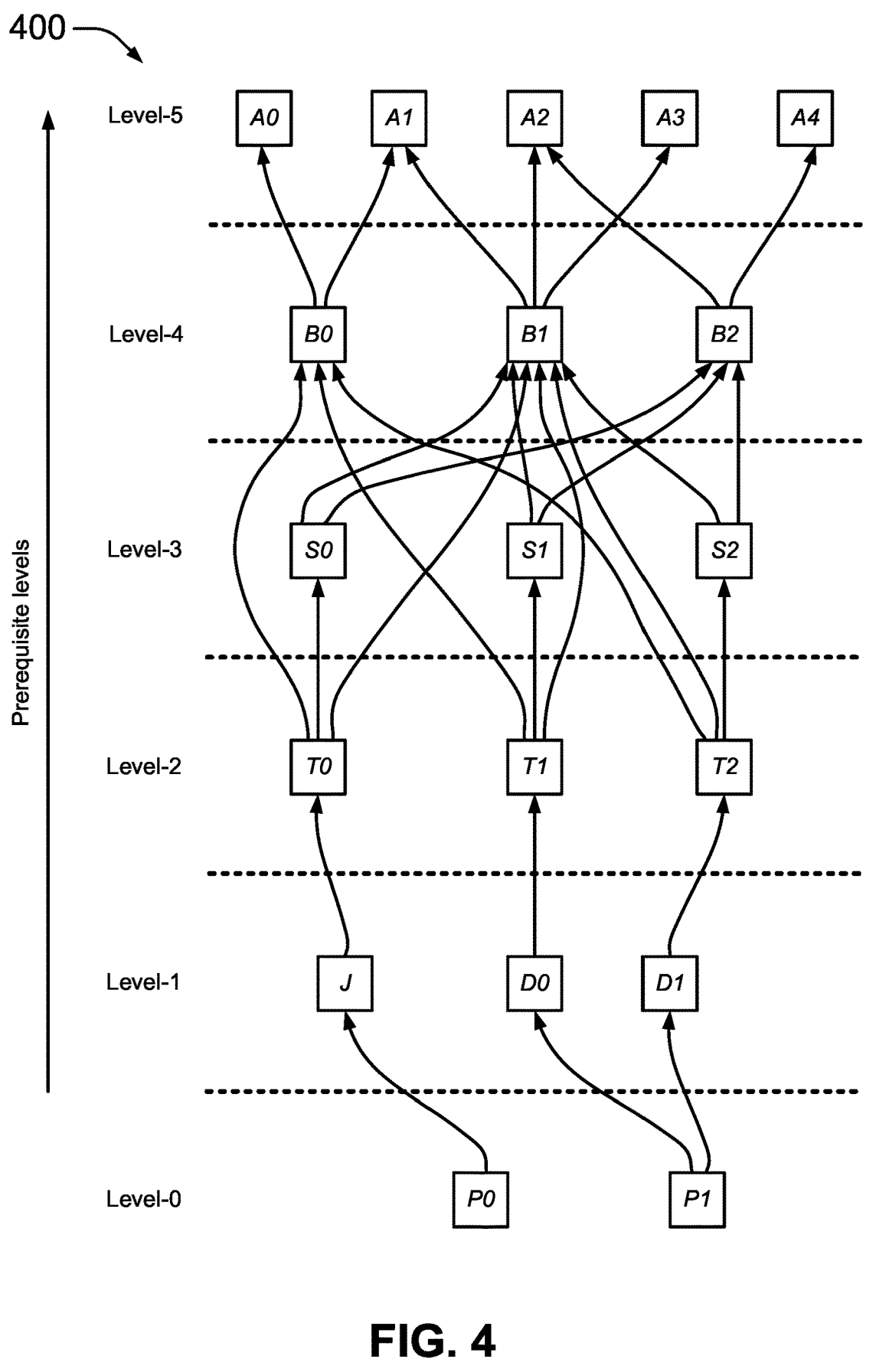

FIG. 4 shows a diagram 400 that illustrates a structure for benchmark measurements and calibrations that stabilize drifting system observables over long periods of time that need to be executed as prerequisites for running any algorithms. It is very inefficient to perform all benchmark measurements and calibrations sequentially as that can dramatically increase the duty cycle of benchmark/calibrations operations and reduce the amount of computation uptime of the quantum computer. Instead of a typical sequential approach, the diagram 400 in FIG. 4 represents an example of a structure of prerequisites that are categorized into several levels (e.g., Level-0, . . . , Level-5) in order of dependency and/or in order of influence on native quantum operations. A connection between an operation in a lower level and an operation in a higher level indicates that performing the operation in the higher level is a prerequisite to performing the operation in the lower level and operations at a higher level may be part of a decision tree associated with a lower level operation. These categorized operations or programs may be referred to as stabilization routines and may include benchmarking, measurements, and/or calibration procedures or similar operations. A system scheduler (or simply scheduler, see e.g., schedulers 285, 315) is then supplied with a formal data structure describing this system of dependencies and coordinates the execution of any tasks required to meet the described prerequisites.

In an example of the benchmarking/calibration structure or framework provided in the diagram 400, J (in Level-1) may denote a program that collects a batch of algorithms and executes them. To meet the one and only required prerequisite for J, the system scheduler executes T0 (in Level-2) which stabilizes the primary observables of the system, namely, tuning of the constituent native gates that are required in J. In this case, T0 consists of a collection of single-qubit and two-qubit gates and follows a logical flow of calibrating primary observables of the system (e.g., laser amplitude and phase) based on the outcome of fast benchmark measurements on each native gate. This logical flow is referred to as a decision tree. T0 is therefore a tuning algorithm consisting of several benchmark and calibration routines navigated based on a decision tree to make the efficient calibrations of primary observables. The decision tree in T0 can, in turn, require certain prerequisites in Level-3 and Level-4 to be met. For example, prerequisite observables that need to be stabilized for T0 to execute faultlessly, could be another decision tree-based algorithm S0 (in Level-3), which stabilizes observable S0. T0 may also involve executing benchmark and stabilization of B1 and B2 (in Level-4), which, in turn, may require stabilization in Level-5 (A1, A2, etc.). It is likely that higher level benchmarks, such as those in Level-4 and Level-5, are less complicated stabilization routines, which could even be a single point enquiry and a single point stabilization of secondary observables such as B1, B2, A1, A2, etc., For example, in a trapped ion quantum computer or QIP system (see e.g., FIGS. 1-3 described above), a Level-5 prerequisite may be observables indicating systematics such as: lasers are on and frequency locked, the classical computer which controls the system is alive, qubit state detection hardware such as a camera and/or PMT are alive, etc. A Level-4 prerequisite might be the presence of an ion-chain, or alignment of lasers to an ion chain for successful qubit control, or the optical alignment between the ion-chain and the camera or PMT for successful qubit detection, etc. These higher level prerequisites are usually stable and seldom fail, hence their benchmark measurements are designed to be fast single point enquiries that are performed repeatedly by low level prerequisite checks or rely on some already available data.

Programs P0 and P1 (in Level-0) allow automation to run in different modes such as mode J, where the system performs computations through algorithm executions or modes D0 and D1, where the system runs automated self-diagnosis and calibration routines to capture long term drifts, which are not tracked under J. Self-diagnosis modes can either run periodically in time or be triggered when automation fails due to expected drifts in the system. Modes D0 and D1 are decision trees designed to calibrate observables that have, in principle, drifted outside the capture (stabilization) range of mode J.

In connection with the diagram 400 in FIG. 4, the techniques described herein for implementing and performing benchmark measurements and calibrations that stabilize drifting system observables over long periods of time and that are based on prerequisites for running any algorithms may include one or more features. For example, one feature is the categorization of stabilization routines of all relevant system observables into prerequisite levels, where each routine benchmarks and calibrates observables that are uncoupled to those of any other routine of the same level. Another feature is an adjudication structure which maintains a hierarchy of prerequisite execution based on prerequisite levels. In other words, a low-level prerequisite can declare a requirement for one or more high-level prerequisites to be met, while the opposite is typically not allowed or enabled. Another feature is that a stabilization routine that runs at the level immediate to that of an algorithm execution is designed to stabilize primary observables which in turn can perform enquiry and stabilization of secondary observables. Yet another feature is that secondary high-level observables are not stabilized to a high degree but are only enquired for discrete failures and subsequently calibrated. Moreover, stabilization routines for each prerequisite could either be a decision tree driven benchmark/calibration sequence or be a relatively simple single-point benchmark/stabilization routine. In addition, a Level-0 routine is one that toggles between the algorithm execution mode and self-diagnosis/ self-calibration mode of the system. Another feature is that self-diagnosis and calibration modes perform calibration of long-term drifts in secondary observables. Finally, self-diagnosis and calibration modes can be invoked by a failure event in automation or periodically in time to maintain long term system stability.

Figure 5A:
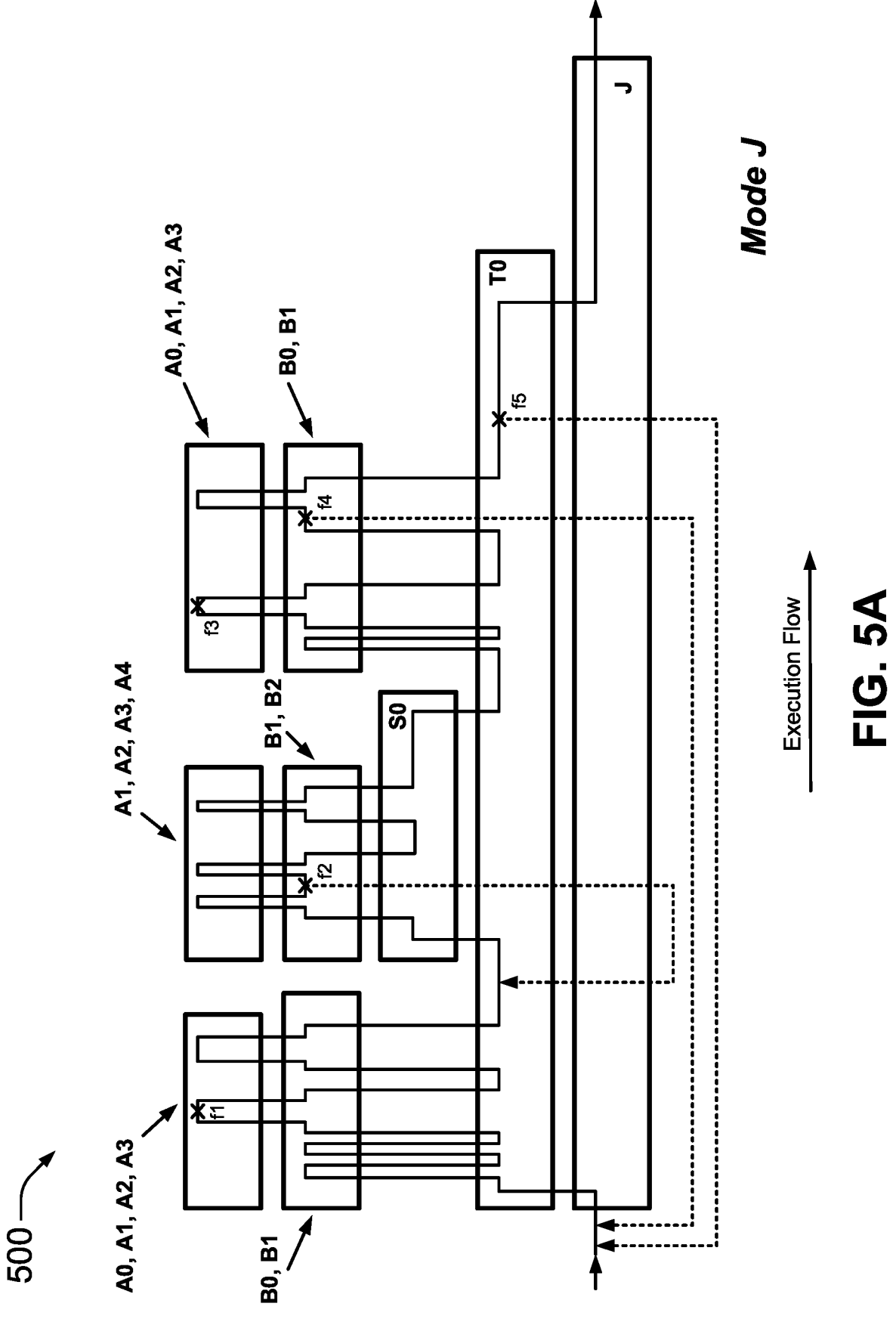
FIG. 5A illustrates an example of the order of executing prerequisites in automation mode J in accordance with aspects of this disclosure.

FIG. 5A shows a diagram 500 that illustrates an example of an order of executing prerequisites for the automation mode J (solid line) in Level-1 when this mode is called as part of an automation background process. The diagram 500 provides a temporal and hierarchical representation of the execution of the prerequisites for when mode J is called by, for example, the program P0 in Level-0 (see e.g., FIG. 5C). That is, the diagram 500 provides an example of the decision tree process for mode J over a period of time. Based on the hierarchy described in the example in the diagram 400 in FIG. 4, the mode J in Level-1 can require prerequisite T0 in Level-2. T0 can require prerequisite S0 in Level-3 and B0 and B1 in Level-4. B0 can require prerequisites A0 and A1 in Level-5 while B1 can require prerequisites A1, A2, and A3 also in Level-5. Moreover, S0 can require B1 and B2 in Level-4, and B2 can require A2 and A4 in Level-5.

The line with the arrow shows the execution flow or path as it traverses different levels and prerequisites. The crosses indicate failure events in various prerequisite levels, which can reset the execution path to the beginning of a low-level prerequisite, as shown using dashed lines with arrows. For example, failure events f1 and f3 show failure cases which do not affect prior calibrations performed at lower levels. In such cases a calibration of the corresponding observable is sufficient and is followed by the remaining prerequisite checks. Failure event f2 indicates a failure where a low-level prerequisite S0 calibration needs to restart because this type of failure invalidates benchmarks and calibrations performed in S0 prior to the failure. Failure events f4 and f5 indicate failure events, which resets execution to the start of mode J as it invalidates very low-level prerequisite checks.

The example shown in the diagram 500 in FIG. 5A is provided by way of illustration and not of limitation. Other execution flows may be possible depending on the type of operation being performed.

Figure 5B:
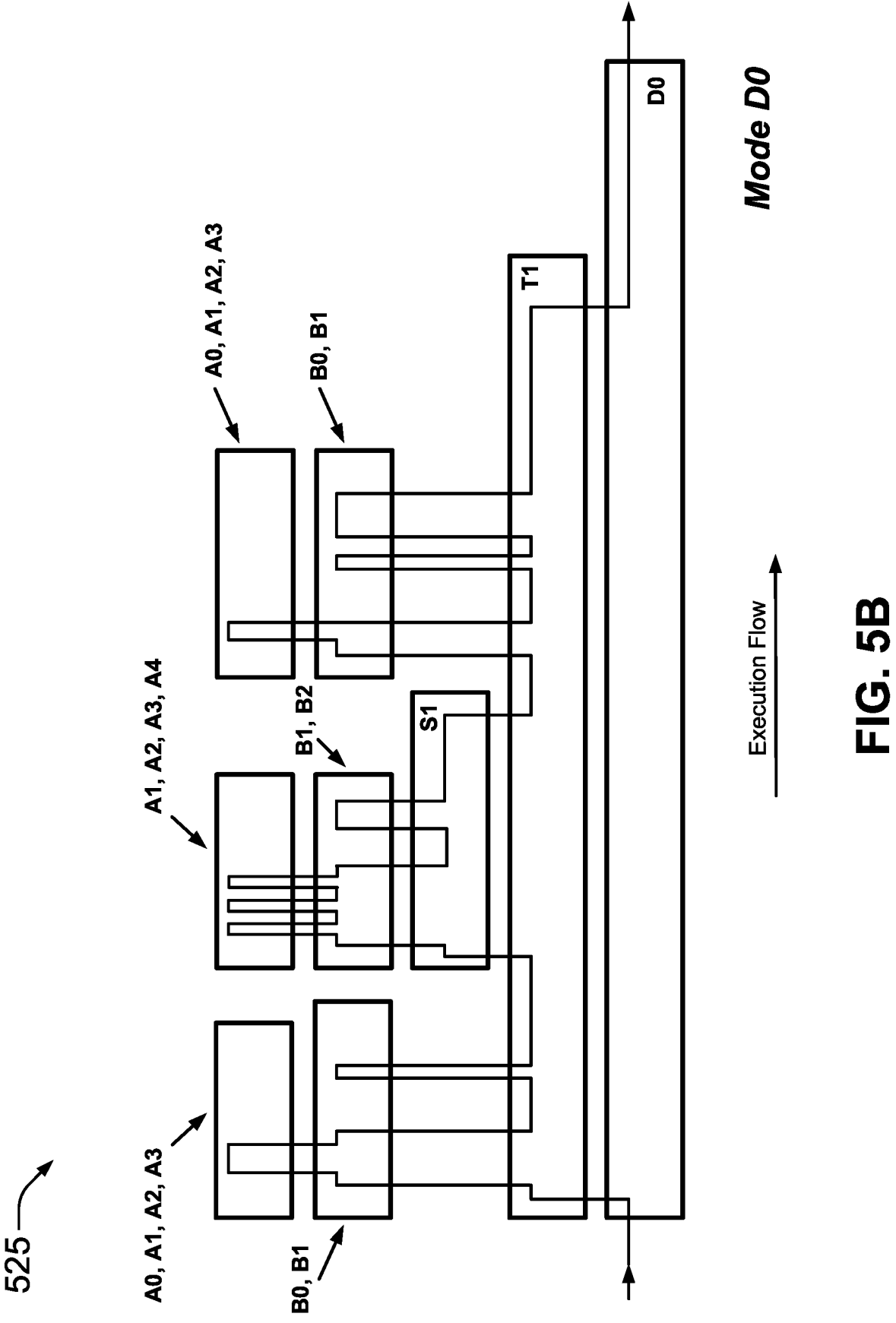
FIG. 5B illustrates an example of the execution flow of prerequisite stabilization for the self-diagnosis and calibration mode D0 in accordance with aspects of this disclosure.

FIG. 5B shows a diagram 525 that illustrates an example of an order of executing prerequisites for the self-diagnosis and calibration mode D0 (solid line) in Level-1 when this mode is called as part of an automation background process. The diagram 525 provides a temporal and hierarchical representation of the execution of the prerequisites for when mode D0 is called by, for example, the program P1 in Level-0 (see e.g., FIG. 5C). That is, the diagram 525 provides an example of the decision tree process for mode D0 over a period of time. Based on the hierarchy described in the example in the diagram 400 in FIG. 4, the mode D0 in Level-1 can require prerequisite T1 in Level-2. T1 can require prerequisite S1 in Level-3 and B0 and B1 in Level-4. B0 can require prerequisites A0 and A1 in Level-5 while B1 can require prerequisites A1, A2, and A3 also in Level-5. Moreover, S1 can require B1 and B2 in Level-4, and B2 can require A2 and A4 in Level-5. What is shown in this diagram (and similarly in the diagram 500 in FIG. 5A) is that the execution path as decided by decision trees in each prerequisite level may be unique to each automation mode. Representative failure events are not shown in this example but may be part of the events that take place during the execution path.

Figure 5C:
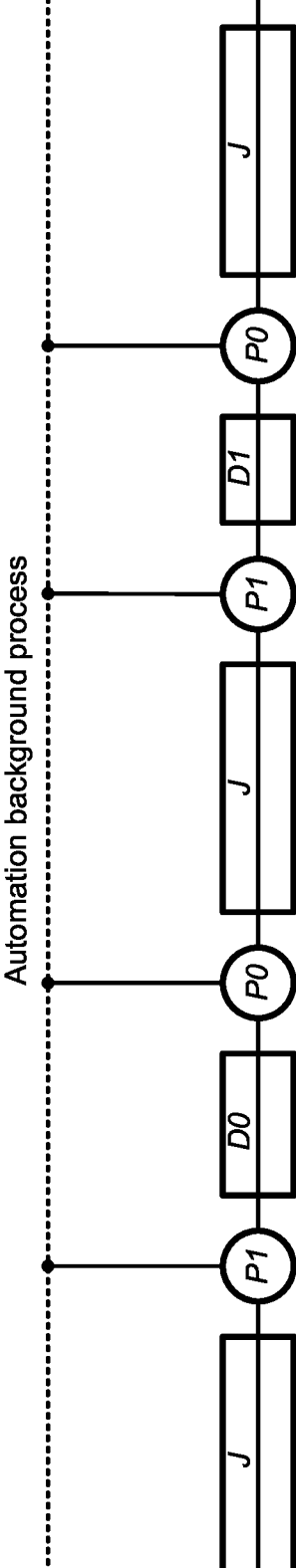
FIG. 5C illustrates an example of an automation background process that runs a process P0 to put automation onto mode J for running algorithms in accordance with aspects of this disclosure.

FIG. 5C shows a diagram 550 that illustrates an example of an automation background process, which may run or execute the process P0 to put automation onto mode J for running algorithms. The automation background process may also run process P1 to put automation into scheduled or triggered self-diagnosis and calibration modes D0, D1 etc. When any of modes J, D0, or D1 is executed, the mode may follow a hierarchy of prerequisite levels based on unique decision trees as illustrated in the example shown in the diagram 400 in FIG. 4.

FIG. 6 shows a method 600 for stabilizing drifting system observables. The method includes, at 610, performing, with a scheduler in a quantum computer or QIP system, an automation background process.

The method 600 further includes, at 620, calling, from the automation background process (see e.g., FIG. 5C), a first mode of operation of the quantum computer (see e.g., mode J) that executes algorithms, the first mode of operation being based at least in part on stabilization routines for measurable system properties of the quantum computer that are directly observable from single-qubit and two-qubit native gates associated with the algorithms.

The method 600 further includes, at 630, calling, from the automation background process, a second mode of operation of the quantum computer (see e.g., mode D0 or mode D1) that executes self-diagnosis and calibration operations, the second mode of operation being based at least in part on stabilization routines for measurable system properties of the quantum computer that are not directly observable from the single-qubit and the two-qubit native gates associated with the algorithms of the first mode of operation.

In another aspect of the method 600, calling the first mode of operation includes calling a first program (see e.g., P0) to execute the first mode of operation.

In another aspect of the method 600, calling the second mode of operation includes calling a second program (see e.g., P1) to execute the second mode of operation.

In another aspect of the method 600, the second mode of operation includes multiple types of the second mode of operation, each of type configured to perform a unique set of self-diagnosis and calibration routines (see e.g., mode D0, mode D1).

In another aspect of the method 600, calling the second mode of operation is called based on a periodic schedule.

In another aspect of the method 600, the second mode of operation is called in response to a failure resulting from a drift in a measurable system property of the quantum computer outside a specified range.

In another aspect of the method 600, the measurable system properties of the quantum computer associated with the second mode of operation are measurable system properties of the quantum computer that drift outside a range supported by the stabilization routines of the first mode of operation.

In another aspect of the method 600, the method 600 further includes implementing a categorization of the measurable system properties of the quantum computer into prerequisite levels, wherein each stabilization routine in the first mode of operation and in the second mode of operation benchmarks and calibrates a measurable system property that is uncoupled from any other stabilization routine in the same prerequisite level (see e.g., diagram 400 in FIG. 4); programming the categorization of the prerequisite levels and their corresponding stabilization routines into the scheduler; and generating instructions associated with performing the first mode of operation and the second mode of operation based on the categorization of the prerequisite levels and their corresponding stabilization routines. Each of the first mode of operation and the second mode of operation is a decision tree that includes stabilization routines from one or more of the prerequisite levels. Moreover, a stabilization routine from a lower prerequisite level in the categorization depends on one or more stabilization routines from one or more higher prerequisite levels in the categorization, and a stabilization routine from a prerequisite level in the categorization cannot depend on a stabilization routine from a lower prerequisite level in the categorization.

In another aspect of the method 600, a stabilization routine in a prerequisite level associated with the first mode of operation is configured to stabilize measurable system properties of the quantum computer that are directly observ-able from single-qubit and two-qubit native gates associated with the algorithms of the first mode of operation, and a stabilization routine in a higher prerequisite level associated with the first mode of operation is configured to enquire and stabilize measurable system properties of the quantum computer that are not directly observable from the single-qubit and the two-qubit native gates associated with the algorithms of the first mode of operation.

The method 600 in FIG. 6 may be supported or implemented in a quantum computer or QIP that includes an ion trap (see e.g., trap 270) configured to hold multiple ions (see e.g., ions 106 in chain 110) for implementing single-qubit gates and multi-qubit gates; and a scheduler (see e.g., scheduler 285, 315). The scheduler may be configured to perform an automation background process (see e.g., FIG. 5C). The scheduler may be further configured to call, from the automation background process, a first mode of operation of the quantum computer (see e.g., mode J) that executes algorithms, the first mode of operation being based at least in part on stabilization routines for measurable system properties of the quantum computer that are directly observable from single-qubit and two-qubit native gates associated with the algorithms. The scheduler may be further configured to call, from the automation background process, a second mode of operation of the quantum computer (see e.g., mode D0 or mode D1) that executes self-diagnosis and calibration operations, the second mode of operation being based at least in part on stabilization routines for measurable system properties of the quantum computer that are not directly observable from the single-qubit and the two-qubit native gates associated with the algorithms of the first mode of operation.

In connection with the quantum computer or QIP system that supports or implements the method 600, the scheduler may be configured to call the first mode of operation is further configured to call a first program (see e.g., P0) to execute the first mode of operation, and the scheduler may be configured to call the second mode of operation is further configured to call a second program (see e.g., P1) to execute the second mode of operation.

In connection with the quantum computer or QIP system that supports or implements the method 600, the second mode of operation includes multiple types of the second mode of operation (see e.g., mode D0, mode D1), each of type configured to perform a unique set of self-diagnosis and calibration routines.

In connection with the quantum computer or QIP system that supports or implements the method 600, the scheduler may be configured to call the second mode of operation is further configured to call the second mode of operation based on a periodic schedule.

In connection with the quantum computer or QIP system that supports or implements the method 600, the measurable system properties of the quantum computer associated with the second mode of operation are measurable system properties of the quantum computer that drift outside a range supported by the stabilization routines of the first mode of operation.

In connection with the quantum computer or QIP system that supports or implements the method 600, the scheduler may be further configured to implement a categorization of the measurable system properties of the quantum computer into prerequisite levels, wherein each stabilization routine in the first mode of operation and in the second mode of operation benchmarks and calibrates a measurable system property that is uncoupled from any other stabilization routine in the same prerequisite level (see e.g., diagram 400 in FIG. 4), store the categorization of the prerequisite levels and their corresponding stabilization routines, and generate the instructions associated with performing the first mode of operation and the second mode of operation based on the categorization of the prerequisite levels and their corresponding stabilization routines. Each of the first mode of operation and the second mode of operation is a decision tree that includes stabilization routines from one or more of the prerequisite levels. Moreover, a stabilization routine from a lower prerequisite level in the categorization depends on one or more stabilization routines from one or more higher prerequisite levels in the categorization.

Aspects of the techniques described above in connection with implementing and performing benchmark measurements and calibrations that stabilize drifting system observables over long periods of time need as prerequisites for running any algorithms are illustrated, at least in part, in FIGS. 4, 5A, 5B, 5C, and 6.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for stable operation of a quantum computer, comprising:

performing, with a scheduler in the quantum computer, an automation background process;

calling, from the automation background process, a first mode of operation of the quantum computer that executes algorithms, the first mode of operation being based at least in part on stabilization routines for measurable system properties of the quantum computer that are directly observable from single-qubit and two-qubit native gates associated with the algorithms;

calling, from the automation background process, a second mode of operation of the quantum computer that executes self-diagnosis and calibration operations, the second mode of operation being based at least in part on stabilization routines for measurable system properties of the quantum computer that are not directly observable from the single-qubit and the two-qubit native gates associated with the algorithms of the first mode of operation;

implementing a categorization of the measurable system properties of the quantum computer into prerequisite levels, wherein each stabilization routine in the first mode of operation and in the second mode of operation benchmarks and calibrates a measurable system property that is uncoupled from any other stabilization routine in the same prerequisite level;

programming the categorization of the prerequisite levels and the corresponding stabilization routines into the scheduler; and generating instructions associated with performing the first mode of operation and the second mode of operation based on the categorization of the prerequisite levels and the corresponding stabilization routines.

2. The method of claim 1, wherein calling the first mode of operation includes calling a first program to execute the first mode of operation.

3. The method of claim 1, wherein calling the second mode of operation includes calling a second program to execute the second mode of operation.

4. The method of claim 1, wherein the second mode of operation includes multiple types of the second mode of operation, each of type configured to perform a unique set of self-diagnosis and calibration routines.

5. The method of claim 1, wherein the second mode of operation is called based on a periodic schedule.

6. The method of claim 1, wherein the second mode of operation is called in response to a failure resulting from a drift in a measurable system property of the quantum computer outside a specified range.

7. The method of claim 1, wherein the measurable system properties of the quantum computer associated with the second mode of operation are measurable system properties of the quantum computer that drift outside a range supported by the stabilization routines of the first mode of operation.

8. The method of claim 1, wherein each of the first mode of operation and the second mode of operation is a decision tree that includes stabilization routines from one or more of the prerequisite levels.

9. The method of claim 8, wherein a stabilization routine from a lower prerequisite level in the categorization depends on one or more stabilization routines from one or more higher prerequisite levels in the categorization.

10. The method of claim 8, wherein a stabilization routine from a prerequisite level in the categorization cannot depend on a stabilization routine from a lower prerequisite level in the categorization.

11. The method of claim 8, wherein a stabilization routine in a prerequisite level associated with the first mode of operation is configured to stabilize measurable system properties of the quantum computer that are directly observable from single-qubit and two-qubit native gates associated with the algorithms of the first mode of operation, and a stabilization routine in a higher prerequisite level associated with the first mode of operation is configured to enquire and stabilize measurable system properties of the quantum computer that are not directly observable from the single-qubit and the two-qubit native gates associated with the algorithms of the first mode of operation.

12. A quantum computer, comprising:

an ion trap configured to hold multiple ions for implementing single-qubit gates and multi-qubit gates; and an automation and calibration controller configured to implement or include a scheduler;

wherein the scheduler is configured to:

perform an automation background process;

call, from the automation background process, a first mode of operation of the quantum computer that executes algorithms, the first mode of operation being based at least in part on stabilization routines for measurable system properties of the quantum computer that are directly observable from single-qubit and two-qubit native gates associated with the algorithms;

call, from the automation background process, a second mode of operation of the quantum computer that executes self-diagnosis and calibration operations, the second mode of operation being based at least in part on stabilization routines for measurable system properties of the quantum computer that are not directly observable from the single-qubit and the two-qubit native gates associated with the algorithms of the first mode of operation;

implement a categorization of the measurable system properties of the quantum computer into prerequisite levels, wherein each stabilization routine in the first mode of operation and in the second mode of operation benchmarks and calibrates a measurable system property that is uncoupled from any other stabilization routine in the same prerequisite level, store the categorization of the prerequisite levels and the corresponding stabilization routines, and generate the instructions associated with performing the first mode of operation and the second mode of operation based on the categorization of the prerequisite levels and the corresponding stabilization routines.

13. The quantum computer of claim 12, wherein:

the scheduler configured to call the first mode of operation is further configured to call a first program to execute the first mode of operation, and the scheduler configured to call the second mode of operation is further configured to call a second program to execute the second mode of operation.

14. The quantum computer of claim 12, wherein the second mode of operation includes multiple types of the second mode of operation, each of type configured to perform a unique set of self-diagnosis and calibration routines.

15. The quantum computer of claim 12, wherein the scheduler configured to call the second mode of operation is further configured to call the second mode of operation based on a periodic schedule.

16. The quantum computer of claim 12, wherein the measurable system properties of the quantum computer associated with the second mode of operation are measurable system properties of the quantum computer that drift outside a range supported by the stabilization routines of the first mode of operation.

17. The quantum computer of claim 12, wherein each of the first mode of operation and the second mode of operation is a decision tree that includes stabilization routines from one or more of the prerequisite levels.

18. The quantum computer of claim 17, wherein a stabilization routine from a lower prerequisite level in the categorization depends on one or more stabilization routines from one or more higher prerequisite levels in the categorization.

\* \* \* \* \*